(12) United States Patent
Haimer (10) Patent No.: US 8,373,104 B2
(45) Date of Patent: Feb. 12, 2013

(54) CROSS-FIELD SHRINK-FIT DEVICE WITH MEANS FOR LIMITING MAGNETIC FLUX LOSSES

(75) Inventor: Franz Haimer, Igenhausen (DE)

(73) Assignee: Franz Haimer Maschinenbau KG (DE)

( * ) Notice: Subject to any disclaimer, the term of this patent is extended or adjusted under 35 U.S.C. 154(b) by 523 days.

(21) Appl. No.: 12/528,221

(22) PCT Filed: Feb. 13, 2008

(86) PCT No.: PCT/EP2008/001096
§ 371 (c)(1),
(2), (4) Date: Apr. 5, 2010

(87) PCT Pub. No.: WO2008/098752
PCT Pub. Date: Aug. 21, 2008

(65) Prior Publication Data
US 2010/0200571 A1    Aug. 12, 2010

(30) Foreign Application Priority Data

Feb. 16, 2007 (DE) ............... 20 2007 002 511 U
Jul. 4, 2007 (DE) ............... 20 2007 009 403 U (51) Int. Cl.
*H05B 6/10* (2006.01)
(52) U.S. Cl. ........ 219/632; 219/600; 219/607; 219/635; 29/447; 29/700
(58) Field of Classification Search .......... 219/607, 219/600, 632, 635, 652, 647, 677; 29/447, 29/700
See application file for complete search history.

(56) References Cited

U.S. PATENT DOCUMENTS

| 6,216,335 B1 * | 4/2001 | Freyermuth | 29/701 |
| 6,861,625 B1 * | 3/2005 | Haimer et al. | 219/607 |
| 7,060,951 B2 * | 6/2006 | Haimer et al. | 219/635 |
| 7,491,023 B2 * | 2/2009 | Oesterle | 409/234 |
| 2003/0168445 A1 | 9/2003 | Haimer | |

FOREIGN PATENT DOCUMENTS

| DE | 2008675 U1 | 10/2000 |
| DE | 102005005892 | 8/2006 |
| EP | 1519632 | 3/2005 |
| WO | WO 2006084678 | 8/2006 |

OTHER PUBLICATIONS

International Preliminary Report on Patentability prepared by the European Patent Office on Aug. 19, 2009, for International Application No. PCT/EP2008/001096, pp. 1-6.
International Search Report prepared by the European Patent Office on Sep. 3, 2008, for International Application No. PCT/EP2008/001096, pp. 1-6.

* cited by examiner

*Primary Examiner* — David Nhu
(74) *Attorney, Agent, or Firm* — Sheridan Ross P.C.

(57) ABSTRACT

The invention relates to a device for inductive heating of an electrically-conducting component section symmetrical relative to an axis, in particular, a sleeve section of a tool clamping chuck for clamping a tool by means of a press fit, wherein the device has several pole pieces made from a magnetically-conducting material arranged in the circumferential direction around the symmetry axis of the component section introduced as required into the device and an induction device for supplying the pole pieces with magnetic flux such that the magnetic flux in pole pieces which are adjacent in the circumferential direction is opposed.

27 Claims, 6 Drawing Sheets

CROSS-FIELD SHRINK-FIT DEVICE WITH MEANS FOR LIMITING MAGNETIC FLUX LOSSES

CROSS REFERENCE TO RELATED APPLICATIONS

This application is a national stage application under 35 U.S.C. 371 of PCT Application No. PCT/EP2008/001096 having an international filing date of 13 Feb. 2008, which designated the United States, which PCT application claimed the benefit of German Application Nos. 202007002511.4 filed 16 Feb. 2007, and 202007009403.5 filed 4 Jul. 2007, the entire disclosure of each of which are hereby incorporated herein by reference.

The invention relates to a device for inductive heating of a component section, which is symmetrical relative to an axis and made of electrically conductive material, in particular of a sleeve section associated with a tool clamping chuck with a receiver opening for supporting a tool through press fit.

It is generally known to heat components, in particular components which are rotation symmetrical relative to an axis, by means of inductively generated Eddy currents, e.g. for annealing, tempering or surface hardening of the component. It is also known to inductively heat the shrink assembly of a sleeve section enclosing an axle or a shaft in press fit, e.g. of a bearing race, and thus, to expand it, so that the sleeve section can be disengaged from the shaft.

Eventually it is also known to shrink the cylindrical shaft of a tool to be driven in rotation, e.g. of a drill or cutter, into a substantially cylindrical receiver opening, which is typically provided in a section of the tool chuck for this purpose, which can be designated as sleeve section. Said tool chuck can be an integral component of a machine spindle. On the other hand, it can also comprise a coupling section, e.g. in the form of a conical end section, through which it is mounted at the operating spindle.

In order to be able to shrink the shaft in, this means in order to be able to establish a shrink fit between the sleeve section of the tool chuck and the tool shaft, the inner diameter of the receiver opening is undersized with respect to the shaft diameter of tools to be clamped according to the invention. For inserting and removing the tool shaft the sleeve section is heated until the inner diameter of the receiver opening is expanded far enough due to temperature, so that the tool shaft can be inserted or removed. A press fit is provided between the sleeve section and the tool shaft after cooling.

A device for disengaging and establishing a press fit between a tool chuck and a tool shaft is known from the German utility model 200 08 675. Said device, which also operates inductively, but according to another basic principle, uses a longitudinal field. The device is configured, so that the sleeve section to be heated of the tool chuck is inserted into the center of an induction coil surrounding it in a circular manner. Thus, the sleeve section is loaded as required with a magnetic field which induces Eddy currents, wherein the induction coil is enveloped at its face adjacent to the free end of the sleeve section by a pole shoe comprising a central pass through opening for the tool and made of magnetically conductive and electrically non conductive material. Said pole shoe comprises a central opening for the passage of the tool, which is sized so that the tool can pass through said opening and on the other hand it is also sized, so that the pole shoe contacts the sleeve section of the tool chuck conformally in the portion of said opening.

In practical applications tool chucks in various sizes are to be operated with such a device, thus tool chucks for clamping tools with a large shaft diameter which comprise a respectively large diameter in the portion of the sleeve section. On the other hand also tool chucks need to be treated, which are used for clamping tools with very small diameters. Said tool chucks are characterized in that they comprise a sleeve section with a very small diameter. This means as a consequence that a set of different pole shoes is associated with the prior art device and that a suitable pole shoe has to be selected in order to treat a particular tool chuck. Said requirement to exchange the pole shoe on the one hand restricts the ability to automatically operate such a device. On the other hand, even though the device is operated manually, exchanging the pole shoes respectively requires time and in particular constitutes a considerable source of operator errors, in particular when the device is to be operated by semi-skilled personnel. Namely when the wrong pole shoe is selected for the tool chuck to be treated, due to inattentiveness or laziness, either clamping or unclamping does not work or even worse, the tool chuck and/or the tool may overheat and thus become unserviceable.

Thus, in order to overcome the problems of such a configuration a device has been proposed which is also operated inductively, but which uses a completely different principle on the coil side. The respective patent application was published as WO 2006/084678 A1. Said device operates according to the so called cross-field principle and is accordingly also designated as cross field coil unit in the art. Said device is comprised of a housing which is substantially rotation symmetrical in principle and which encloses a circular cylindrical cavity. The sleeve section to be heated is inserted into said cavity. Pole pieces are provided which are movable toward the sleeve section in radial direction. A coil which can be loaded with AC power rides on each pole piece in order to generate a respective magnetic flux in the respective pole piece. Thus, the coils are configured, so that the magnetic flux of pole pieces adjacent in circumferential direction has opposite direction.

In order to start operating the device, the pole pieces are typically moved inward in radial direction until they conformally contact the sleeve section to be heated. As a matter of principle no shielding of the tool shaft is required, which protrudes from the sleeve section to be heated, which removes the necessity of different pole shoes.

However, disadvantages of said device are comprised in that though the pole pieces can be brought in conformal contact with the different sleeve sections, the system is by far not optimal in all cases. This means that in various cases either the potential of the system cannot be used optimally, or at least in extreme cases the pole pieces have to be exchanged or complex pole shoes with partial sections moveable relative to each other have to be used in order to thus facilitate an improved contact, thus e.g. pole pieces which can be moved in segments somewhat similar to the tumblers, of a safety lock.

At least under certain conditions, (thus depending on how far the pole pieces have to be moved towards one another in radial direction in order to contact the respective sleeve section) magnetic shorts can occur between adjacent pole pieces or between a pole piece and the housing.

Thus, it is the object of the invention to provide a device which facilitates an improved contact with simple means between the pole pieces and in particular the different sleeve sections of the various different tool chucks to be heated by the device and in which in particular the losses through magnetic shorts between the pole pieces amongst one another and/or a pole piece and the housing supporting said pole piece are reduced at least.

Said object is accomplished by the features of patent claim 1.

According to the invention it is provided that the pole pieces are rotatably supported respectively at the device about an axis (the feed rotation axis) extending substantially in parallel to the axis of symmetry of the component section to be heated, so that each of the pole pieces can be fed by a rotation about the associated feed rotation axis in direction to the surface portion to be heated of the particular work piece.

It is further more advantageous that the device comprises means for reducing an undesired short magnetic flux between adjacent pole pieces and/or a pole piece and the housing and said means are comprised in that only a portion of the pole pieces provided at the device is simultaneously loaded with power and/or the housing between adjacent pole pieces is bulged in radially outward direction, so that the air distance between the pole piece associated with said bulge and the bulged out section of the housing wall is increased.

Different from the known cross field coil unit, the device this way is not limited to always moving only the same narrow faces of the pole pieces, which faces have a substantially defined contour, towards the respective sleeve section to be heated or to bring it in contact therewith. This way, rather the substantially larger flank surface of the pole pieces is available without having to provide a translatoric movement of the pole pieces which can only be implemented with complexity.

Thus an improved interaction between the surface of the sleeve sections to be heated and the pole pieces can be facilitated in a simple manner, regardless if the pole pieces (typically) come into conformal contact with the respective sleeve section, or come only into close proximity to said sleeve section. In as far as the pole pieces are provided for conformal contact with the surface of the sleeve section to be heated, further additional simple measures for improving the conformal contact can be used in such a configuration.

This way, the device according to the invention can heat various component sections in a particularly effective manner which sections are symmetrical to an axis and made of electrically conductive material, like e.g. rotation symmetrical axle- or shaft sections, but in principle also polygon sections like e.g. octagonal bar stock or similar, though the advantages of the device according to the invention can be used primarily for heating rotation symmetrical component sections like e.g. the sleeve sections of various tool chucks.

It is furthermore appreciated that the feed rotation axis does not have to be defined in space, so that the pole pieces can only be rotated about said feed axis. The requirements placed upon the feed rotation axis by the invention can rather also be fulfilled by ball joints or similar which only among other things facilitate a rotation of the pole pieces about the axis defined as a feet rotation axis, but which simultaneously also facilitate other rotations.

A substantial advantage may also be that only a portion of the pole pieces provided in the device are simultaneously actively loaded with magnetic flux, wherein the coils which generate the magnetic flux in these pole pieces are turned on. This way, the air distance between pole pieces actively loaded with magnetic flux is increased since a momentarily inactive pole piece is typically provided between two such pole pieces, this means a pole piece whose coil is not turned on at the moment. This yields a higher efficiency at the same power level and thus yields a quicker heating of the sleeve section to be treated.

Thus, it may be a substantial advantage that the housing is bulged out in radially outward direction (compared to a circular housing with reference to the cavity receiving the pole pieces) between the support locations of adjacent pole pieces (with reference to the axis of symmetry of the sleeve section inserted into the device as intended), so that the air distance between the pole piece associated with said housing and the bulged out section of the housing wall is increased. Namely typically, so that at least the air distance between the portion of the pole piece which is intended to conformally contact the various work pieces to be heated and the housing is increased, so that no substantial magnetic flux occurs directly between said section of the pole piece and the housing anymore. Also this measure yields a higher efficiency at the same power level and thus a quicker heating of the sleeve section to be treated. This applies in particular to devices with pole pieces which are pivotable instead of radially moveable and which due to their position in the housing caused by the pivoting are exposed to the risk of losses due to "magnetic short" directly between the pole piece and the housing to a particularly high extent.

Based on this, a particularly preferred embodiment of the invention is provided. It states that each of the pole pieces is supported rotatable about plural axes at the device, so that each of the pole pieces can be fed towards the component section to be heated of the particular work piece through a rotation about an associated rotation axis and that it can then be pivoted about another respectively additionally associated axis, so that it closely conformally contacts the surface to the component section to be heated. In order to implement said improvement of the invention, said ball joints recited supra are particularly useful. Said improvement of the invention is relevant in particular for heating sleeve sections of tool clamping chucks. This is because the sleeve sections of tool chucks not only have very different diameters, but also have a conical outer contour, wherein the cone angle can vary within a certain bandwidth depending on the manufacturer.

Another preferred embodiment of the invention provides that the height of the pole piece increases from its tip to its feed rotation axis. The height of a pole piece for this purpose is the extension of the pole piece substantially parallel to its feed rotation axis. Thus, it is possible to take into consideration that the sleeve sections to be heated of tool clamping devices which are provided for supporting tools with small shaft diameters in a shrink fit are substantially shorter in the direction of the symmetry axis of the sleeve section, than those of tool clamping chucks which are used for supporting tools with large shaft diameters.

The device according to the invention is preferably configured, so that the portion of the pole pieces, which comes into conformal contact with the component sections to be heated of the various components as intended, has a convex curvature.

Another preferred embodiment provides that the surface section of the pole pieces, which comes into conformal contact with the sleeve sections to be heated of the various tool chucks as intended, is comprised of a number of discrete contact surfaces which are disposed in series essentially in the direction from the tip of the pole piece to the feed rotation axis, wherein each of the contact surfaces is disposed and configured, so that it can be brought into contact with the sleeve section of at least one of the different tool clamping chucks to be heated by the device as intended.

It is advantageous to configure the device according to the invention, so that the pole pieces are preloaded in feed direction about the feed rotation axis, so that they automatically conformally contact the respective component section to be heated, as soon as they are released from their lifted off position. This avoids errors when operating the device. The function is herein that the pole pieces are pivoted upward about their feed rotation axis against the preload in order to insert the component section to be heated as intended, thereafter the component section to be heated is inserted into the device and positioned in the device as intended, as soon as the force forcing the pole pieces into their open position manually or motorically is removed, the pole pieces automatically conformally contact the respective component section to be heated.

Thus, ideally the support and the preload of the pole pieces is respectively configured, so that the pole pieces not only automatically conformally contact the respective workpiece under the effect of the preload, but thus so that they additionally pivot relative to the workpiece under the effect of the preload after the first contact with the workpiece, so that the contact portion between the component section to be heated and the pole piece is even increased, since the pole pieces still rotate about another axis under the effect of the preload, and thus optimally conformally contact the component section to be heated. This way it is assured that the pole pieces, in particular when heating sleeve sections of the different clamping chucks, always automatically tightly and conformally contact the different outer contours of the sleeve sections to be heated.

Advantageously all pole pieces are coupled with an actuator by means of which they can be jointly rotated into a lifted off position. The actuator is preferably configured in the form of a rotatable control sprocket which is supported at a locally fixated, possibly elevation adjustable housing component of the device, which control sprocket is coupled to the pole pieces through a lever assembly or through a teething and which can thus pivot them relative to their feed rotation axis when said control sprocket is rotated. Such an actuator is not only advantageous during manual operation of the device, since it facilitates to uniformly pivot all pole pieces up with a hand movement, but it is also advantageous in particular during an automated operation of the device. Thus, an electric motor, a pneumatic actuation cylinder or an electric pull- or push magnet which rotates the actuator can be very simply coupled with the actuator. Alternatively, it is certainly also possible to separately control the pole pieces. This is also facilitated in that each of the pole pieces comprises a lever type section, by which the pole piece can be pivoted through pull or push, e.g. by means of a pull- or push magnet.

A preferred embodiment provides that the device comprises a sensor which measures the position of the pole pieces at the work piece to be heated. This is preformed preferably in that the rotation angle of the pole pieced is detected. This can be preformed directly at the pole piece, or when using an actuator, by measuring the position of the actuator, or by detecting a signal at the electrical, pneumatic or magnetic actuation organ for the actuator, which signal is proportional to the position of the actuator and thus also proportional to the rotation angle of the pole pieces. Thus, it is very helpful that the rotatability of the pole pieces about their feed rotation axis according to the invention facilitates it in a very simple manner to reliably determine the position of the pole pieces. When the position of the pole pieces is known, this can be efficiently used in order to automatically determine the dimension of the component section to be heated at present and to subsequently adjust proper operating temperatures for the induction coils. This is not only used for energy savings, but it minimizes in particular the risk of operator errors, since the component section to be heated is automatically heated as required for removing or establishing the press fit. An overheating which could impair the component section to be heated or even the component disposed in a press fit therewith is prevented. Furthermore, the cycle time is optimized in any case, since the component section is not heated more than necessary and thus does not have to cool down longer than necessary.

Ideally, also a sensor is provided whose current measurement value is a measure for a temperature momentarily reached in a portion of the component section to be heated. Thus, the sensor is preferably a temperature sensor measuring contactless. Typically, it is oriented to a portion of the component section to be heated, thus it directly measures the temperature of the component section to be heated and does not barely draw conclusions with respect to the component section to be heated from the temperature of a component which is only of secondary interest. In particular the contactless temperature measurement has the advantage that measurement errors due to the insufficient contact of the temperature sensor or due to unexpected heat transfer resistances are being avoided.

Preferably, the device comprises a cooling facility, by means of which the re-cooling of the heated component section is accelerated. The cooling facility thus uses a cooling liquid or compressed air as coolants. The coolant ideally exits through a plurality of nozzles and cools the surface of the heated component section substantially uniformly. This means that the cooling process occurs in any case, so that no disadvantageous stresses are induced in the heated and thus to be cooled component section through temperature differences occurring at the moment under the influence of the coolant.

A preferred embodiment provides that the coolant is substantially scavenged. In as far as water or another liquid are used as coolants, they are sprayed onto the heated component section finely distributed, so that a substantial portion of the liquid volume used for cooling evaporates and can then be scavenged. This way, it is mostly avoided that the device becomes wet or larger volumes of coolant drip off downward and puddles form in the portion of the device and/or sections of the component which are disposed outside of the heat treated component portion are wetted by the liquid, so that a corrosion risk exits. This is particularly important for tool clamping devices—tool clamping chucks which are stored for further use after the tool has been shrunk out do not have to be dried first.

Where necessary, the device comprises a facility for capturing and scavenging cooling water which runs off or drips off in downward direction. This way, it is assured that no uncontrolled coolant run off or an undesired large surface wetting of other component sections, than the component section to be cooled, occurs even when too much coolant is applied.

When liquid coolants are used, the required coolant volume is advantageously dosed either as a function of the measured surface end temperature of the heated component section, or as a function of the size of the component section to be heated, which size is determined through the position of the pole pieces.

Ideally, the device according to the invention is configured, so that the pole pieces comprise channels flowed through by the coolant, which are preferably configured so that the coolant first cools the pole pieces and cools the heated component section from there. This is of particular relevance for the quickly timed automated operation of the device. Though the pole pieces are made of electrically non conductive material and thus do not heat up directly under the influence of the alternating field conducted by them. However, since the pole pieces conformally contact the component, heat is transferred to them from the component. Said heat is dissipated through the channels in the pole pieces which are flowed thru by the coolant, which also prevents an impermissible heat up of the pole pieces in quick cycle operation. A particularly small complexity for the cooling is thus created when the channels flowed thru by the coolant are configured, so that the coolant first cools the pole pieces and is directly fed to the heated up component section.

Ideally, the channels flowed thru by the coolant extend transversal to the pole pieces, so that the coolant enters into the pole pieces on the back sides of the pole pieces facing away from the heated component section and exits from the pole pieces on the front side of the pole pieces facing towards the heated components section. Thus, said pole piece is preferably provided with plural cooling channels disposed next to one another preferably, so that substantially the entire portion of each pole piece which can be brought in direct contact as intended with the component sections to be heated is disposed within a zone flowed thru by coolant. Such an embodiment, thus not only enables an effective "co-cooling" of the pole pieces, but it also assures in particular a more effective and more uniform cooling of the heated component section, since the coolant in such a configuration is always fed on the shortest path to the locations to be cooled, regardless of the respective diameter of the component section to be heated. This is advantageous compared to a cooling device which is disposed fixated irrespective of the pole pieces. Thus, a cooling device of the latter type does not assure that the coolant really impacts all component sections in an optimum manner, which are very different with respect to their thickness or geometry and which were heated by the device.

Preferably a respective plenum is applied (preferably also glued on or soldered on so it seals) on the back sides of the pole pieces, which back sides face away from the heated component section, which plenum is fed with coolant at the proper time through a conduit which does not substantially impede the rotation of the pole pieces, which plenum then in turn feeds the coolant inlet openings at the back side of the pole pieces. This way, the cooling can be directly implemented by means of the pole pieces in a very simple manner, since the pole pieces themselves are typically comprised of a very hard sintered metal which is difficult to machine and in which it is difficult to install cooling channels extending in different directions, thus a central cooling plenum channel along the longitudinal axis of the pole piece from which other cooling channels the branch off transversal to the pole piece. Thus, it is particularly practical manufacturing option to first install the cooling chamber on the back side of the respective pole pieces and then to drill the cooling channels into the pole piece, so that they reach through the pole piece thus establishing a connection to the plenum on the back side of the pole piece.

Another preferred embodiment of the device according to the invention provides that the magnetic field generating coils and/or the bearings moveably supporting the support pieces are sealed against the penetration of coolant. Preferably, this is performed respectively in the form or a moveable seal device like e.g. a gaiter. The coil and/or the bearing of the respective pole piece is then disposed on the back side of the seal device protected against coolant access. The seal facility comprises a cutout through which the pole piece protrudes into the portion of the component section to be heated, which cut out reaches around the pole piece so it is sealed. In case of a gaiter, such a cutout can be an opening in the gaiter, which is configured so that the edges of the opening closely contact the surfaces of the pole piece protruding through the opening, so that said edges seal.

Ideally the seal device is configured as an integral seal bellows, which is substantially closed in circumferential direction and in which bellows a gaiter is fabricated for each pole piece. This way, the coolant loaded core portion of the device can be sealed very easily relative to the outer portion of the device, where no coolant ingress must occur. Thus, it is appreciated that the seal bellows, in a device into which the component section to be heated is inserted from the bottom in upward direction, is certainly not closed all the way around, but it is open on the top and on the bottom, namely so that the component to be heated can be inserted from below into the portion of the seal bellows which is substantially closed in circumferential direction, and possibly a component section, or in case of a tool clamping chuck the tool supported therein in a press fit, can protrude in upward direction from the portion enclosed by the seal bellows in circumferential direction. It is only important that the respective openings in the seal bellows, possibly in combination with other housing components, are configured so that the coolant cannot exit from said openings, so that it so to speak circumvents the seal bellows in order to then still reach the areas where no coolant ingress must occur.

An ideal tool clamping device in the sense of the invention is automated, operated with an electronic control and does comprise a sensor which measures the position in which the pole pieces conformally contact the sleeve section of the respective tool clamping chuck and which adjusts the individual heating time and/or the heating power and preferably the individual coolant supply and/or the time of the coolant application of the tool clamping device. This can be performed by empirically determining for the entire series of the tool clamping chucks to be heated by the tool clamping device, which heating time and/or heating power is optimal in the respective case. The same is preferably also determined with respect to the coolant. The association of the parameters with the sleeve section actually to be heated or cooled of the respective tool clamping chuck is performed through the measured position of the pole pieces. Further advantages, use- and configuration options of the device according to the invention can be derived from the subsequent descriptions of the embodiments.

Figure 1:
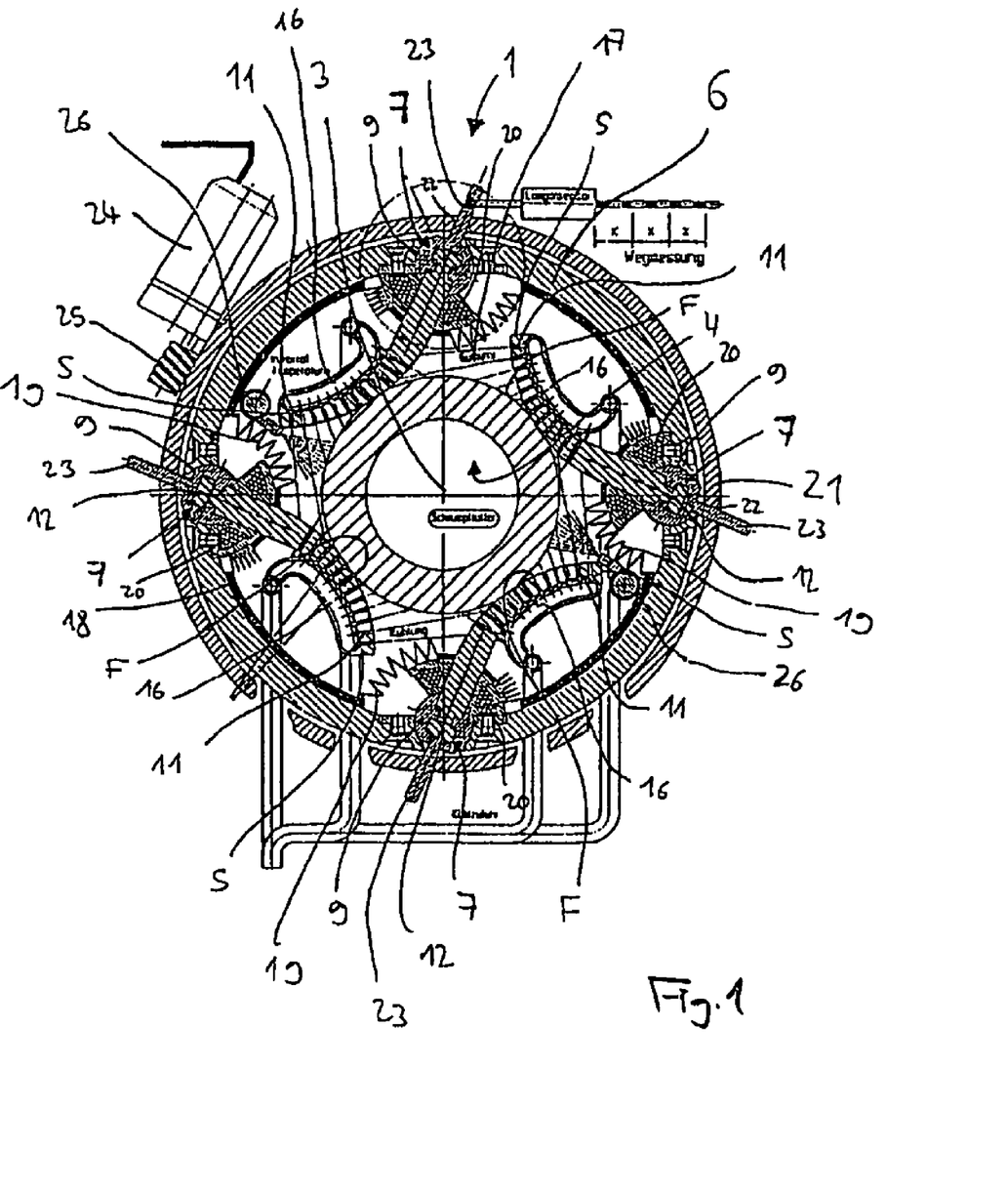
FIG. 1 shows a first embodiment of the invention in a horizontal sectional view, wherein said embodiment is characterized in that its pole pieces are magnetically activated in a certain manner in order to counteract a short magnetic flux directly between the pole pieces.

FIG. 1 shows an embodiment which illustrates the basic principle of the device according to the invention, here with reference to a tool clamping device. Said device is subsequently abbreviated as "induction clamping device". Said device is provided or combined with a control (not shown) which controls the pole pieces in a certain manner to be described in more detail infra, so that no substantial short magnetic flux occurs between adjacent pole pieces.

In FIG. 1, the cross section of a sleeve section of a tool chuck which is not shown in more detail is characterized by the reference numeral 2. The sleeve section 2 is rotation symmetrical to the operating rotation axis 3 of the tool chuck, besides imbalances caused by tolerances, which can never be entirely avoided and which are tolerable and comprises a receiver bore hole 4, into which the shaft of a tool can be inserted or is inserted, so that a press fit between the tool shaft and the sleeve section 2 is provided as intended. It is known to a person skilled in the art how tool chucks are configured overall in practical applications and this is furthermore illustrated in FIG. 2 in an exemplary manner. Only for reasons of completeness it is appreciated that almost all the sleeve sections of the typical tool chucks comprise a slightly conical enveloping surface at their outer enveloping surfaces, wherein the cone angle of the individual enveloping surfaces can vary with certain limits depending on the manufacturer and depending on the application. Depending on the diameter of the tool shaft to be clamped through press fit as intended, the sleeve sections comprise significantly different diameters, lengths (in the direction of the operating rotation axis 3) and wall thicknesses, which yields significant differences with respect to the mass of the respective sleeve section to be heated in a particular case.

In order to establish the required press fit between the sleeve section 2 and the respective tool shaft, the sleeve section 2 is inductively heated (to approximately 450°). Due to thermal expansion, the sleeve section 2 thus expands far enough, so that the cold tool shaft can be inserted into the receiver bore hole in spite of its oversize. Through the cooling of the sleeve section, then the desired press fit between the sleeve section and the tool shaft is established, so that the tool shaft is supported in the sleeve section torque proof and the respective nominal torque can be transferred from the tool shaft through friction locking onto the sleeve section and versa.

In order to disengage the press fit, the sleeve section is heated again. Again this is performed inductively. Herein the fact is being used that Eddy currents by which the sleeve section is loaded remain at the surface of the sleeve section, due to the known skin effect, whereby the sleeve section is heated through thermal conduction from the outside in inward direction. Thus, it is possible to heat the sleeve section to a temperature of 450° C. before a substantial heat transfer occurs into the shaft section of the tool which is inserted into the sleeve section, so that a short time window is achieved during which the shaft section of the tool which is still substantially cold can be pulled out of the sleeve section which is already sufficiently expanded.

In order to make the length of the said time window sufficiently large, so that there is sufficient opportunity to reliably pull the tool out, but also in order to avoid a local overheat, it is essential to heat the sleeve section not only quickly, but thus also as evenly as possible.

Only for reasons of completeness it shall be stated that the tool chuck 5 can be a component of an operating spindle of a machine tool, or an independent component with a quick release coupling at the side facing away from the sleeve component (e.g. steep cone coupling or hollow shaft coupling).

The actual induction clamping device 1 is comprised here of a substantially round housing 6, which is shown by FIG. 1 in a horizontal sectional view. It is open at its bottom side, so that its respective tool chuck can be inserted into the center of the housing from below, or so that the housing can be can be pushed over the respective tool chuck from above. Another opening of the upper side of the housing facilitates that longer tools clamped into the tool chuck can protrude upward from the housing and that tools can be inserted into the tool chuck from above or pulled out of the tool chuck in upward direction. The induction clamping device can certainly also be operated "lying horizontally", the sectional plane of FIG. 1 would then be an imaginary vertical plane.

As apparent from FIG. 1 pole pieces 11 are rotatably supported at the housing 6 by means of joints rotatable about plural axes provided here in the form of ball joints 7. For said purpose, the housing is configured with typically separately inserted ball sockets 9, herein it is configured with integral ball sockets 9, into which the ball pieces 10, are rotatably inserted. The ball pieces 10 are supported at the ball sockets 9 by washers with a spherical bevel by means of bolts. The ball pieces 10 respectively support a pole piece 11, which is inserted into a groove in the ball piece 10. Through the ball pieces 10 a respective feed rotation axis 12 is respectively associated among other things with the pole pieces 11, which feed rotation axis extends completely parallel to the operating rotation axis 3 of the tool chuck.

The pole pieces are comprised of magnetically well conductive and electrically non conductive material, like e.g. the ferrite materials known for such an application.

Advantageously an induction coil rides on each of the pole pieces, so it can so co-rotate, which induction coil loads the respective associated pole piece with a magnetic field. Now, it is crucial that said induction coils are controlled in a certain manner. Namely always only two induction coils are turned on simultaneously and thus the induction coils of two pole pieces diametrically opposed. Thus, typically the procedure is that said two induction coils remain turned on for a certain amount of time and that they then are then turned off again. Simultaneously or subsequently thereto, the two induction coils of the pole piece pair, which was inactive so far, are being turned on. After a certain time period, said induction coils are turned off again and the cycle starts again by activating said pole piece pair. This way, between two momentarily active pole pieces there is always a momentarily inactive pole piece on, both sides, so that an increased air gap is always provided between the two momentarily active pole pieces. Namely, an air gap which is large enough, so that no short magnetic flux or at least no substantial short magnetic flux occurs between the momentarily active pole pieces. Thus, a very even heating is still accomplished through the cyclic alternation of the activation of the pole pieces.

The fact that the induction coils ride on the pole pieces facilitates their rotatability according to the invention. Thus, with induction coils disposed differently, it is rather difficult or significantly more complex to load the pole pieces with the required magnetic flux irrespective of their relative rotation position. Advantageously, the induction coils are configured, so that they are used as rotation limiters for the pole pieces, but so that they do not otherwise restrict their rotatability.

Figure 3:
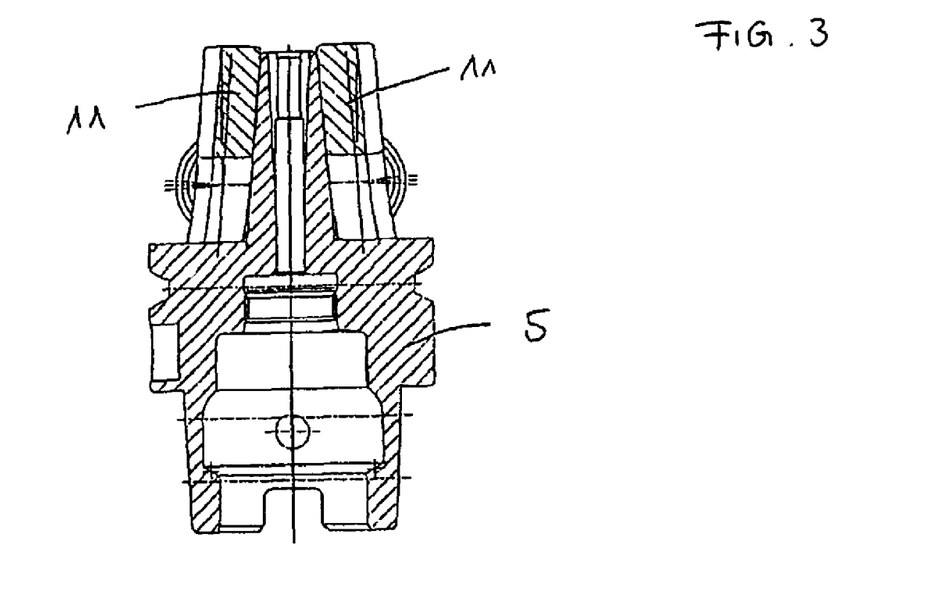
FIGS. 3 and 4 show the angular adjustability of the pole pieces caused by the ball joints with reference to detail illustrations of the first embodiment.
Figure 4:
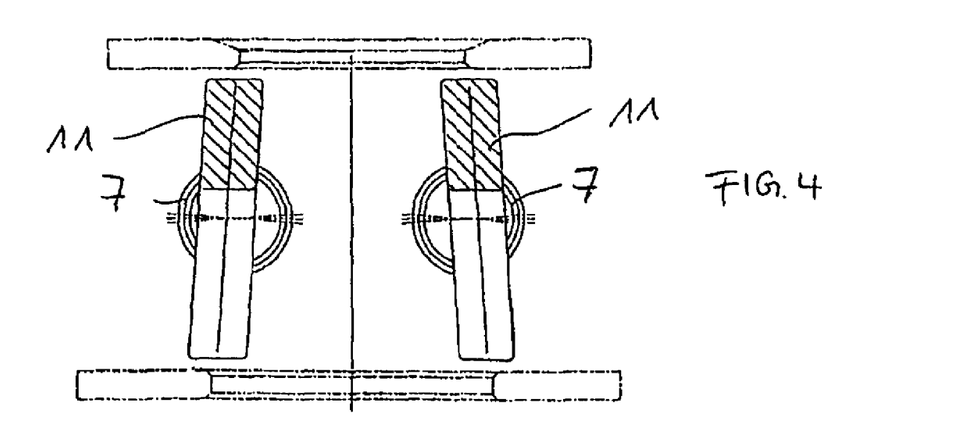

About said feed rotation axis 12 the pole pieces can be pivoted towards the sleeve section 2 to be heated of the tool chuck 5, typically so far that a first conformal contact of the pole pieces occurs at the sleeve section to be heated. In case the first contact (e.g. due to a respective cone angle of the sleeve section to be heated) does not yet establish an optimum conformal contact between the pole piece and the component section or sleeve section to be heated, the ball joint facilitates that the pole piece 11 performs an additional pivot- or tilt movement. This assures that the pole piece conformally contacts the best way possible. The "angular adjustment" of the pole pieces described supra is illustrated in particular by FIGS. 3 and 4.

In said embodiments, different from the prior art, the pole pieces do not contact the sleeve section to be heated with their faces but with their flanks.

Figure 5:
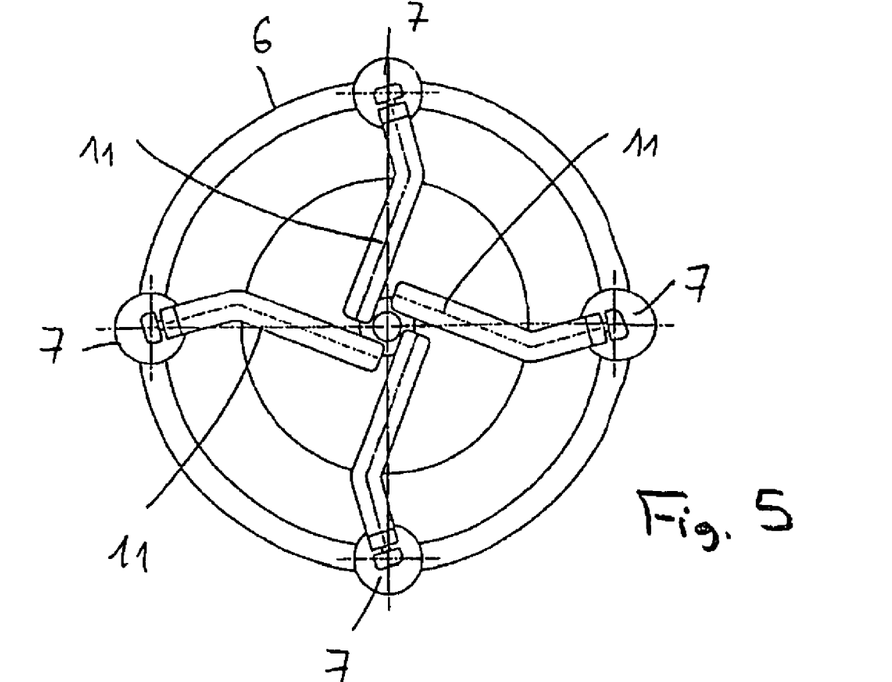
FIGS. 5 and 6 show a second embodiment of the invention, which is configured with differently shaped simplified pole pieces.
Figure 6:
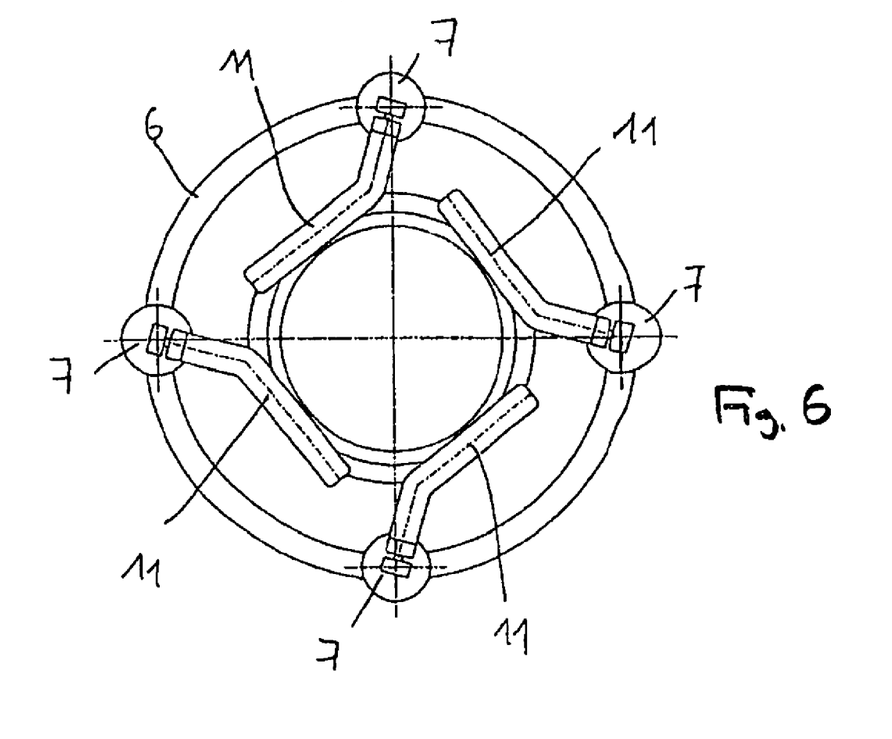

In view of FIG. 1 it is apparent that the narrow or possibly more or less linear portion, by which the flank of the pole piece contacts the enveloping surface of the sleeve section to be heated, is disposed at totally different locations of the flank, depending which diameter the sleeve section presently to be heated comprises, this means how far the pole pieces have to pivot inward towards the operating rotation axis 3 of the respective tool chuck in order to reach the surface of the sleeve section to be heated. FIGS. 5 and 6 illustrate this with reference to a second embodiment of the device according to the invention, which is provided with pole pieces pivoting in the same manner.

Figure 2:
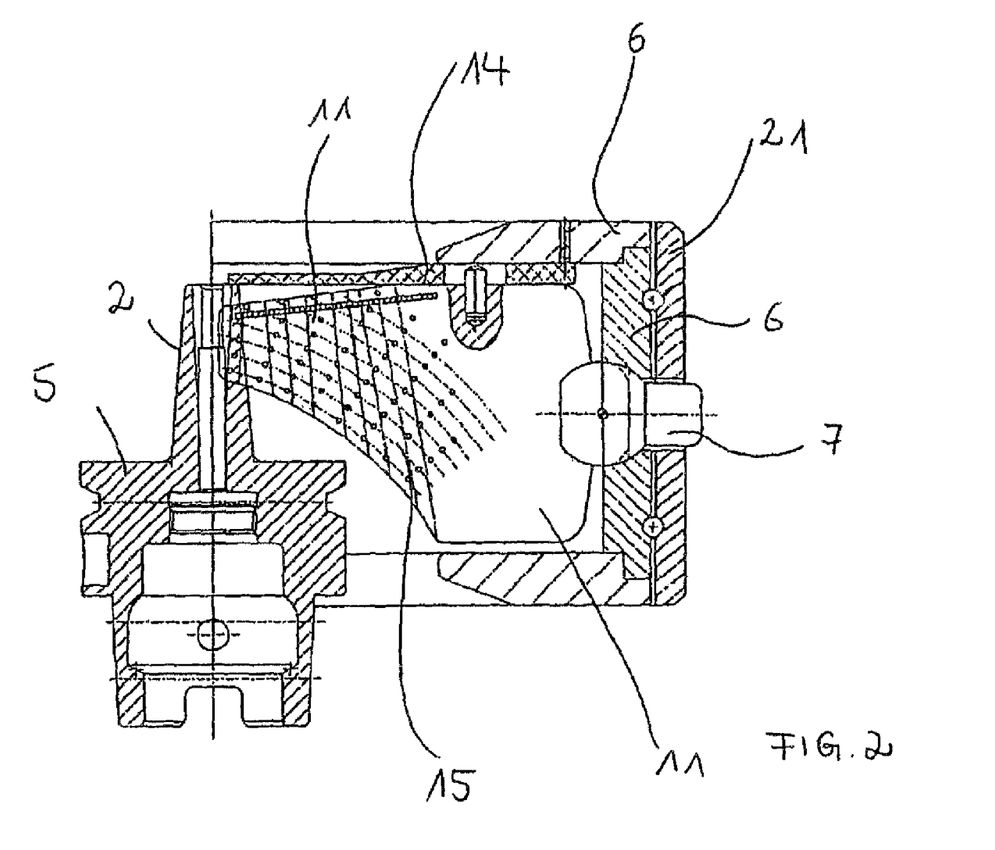
FIG. 2 shows the first embodiment of the invention in a partial lateral cut view, so that a pole piece is visible in detail.

This is important, in particular also for induction clamping devices for heating sleeve sections of tool chucks, since this facilitates for the first time in a simple manner without multi piece pole pieces or even pole pieces moveable in themselves, to provide a plurality of different partial surfaces 13 at the pole pieces, which when used as intended, respectively only come in contact with particular components to be heated (e.g. sleeve sections of certain tool chucks) and which can therefore be optimized, so that they contact said tool chuck in an optimum manner. FIG. 2 shows a view of the flank F of one of the pole pieces 11 and also shows the partial surfaces 13 disposed next to one another on the flank F. The boundaries between the particular partial surfaces 13 which are more or less defined are illustrated with dashed lines in FIG. 2. As a matter of principle, the partial surfaces can be computed, at least in a first approximation, when a group of enveloping surfaces is specified which correspond to the circumferential surfaces to be contacted of the different sleeve sections to be heated as intended and by subsequently establishing the condition that in principle a partial surface, which is known with respect to its position, has to coincide on each of said enveloping surfaces with a partial surface 13 of the pole piece when the pole piece is rotated accordingly. In cases where the computations are too complex, or do not achieve the desired result in a simple manner, e.g. because each partial surface shall be a compromise between the adjustment to different contours of various sleeve sections, tests can be performed, possibly in a supplemental manner. A person skilled in the art is familiar with methods in the art to be used in order to reach the object with this approach.

The curve shape of the flanks F of the pole pieces 11 which is overall convex relative to the surface of component section to be heated supports the association according to the invention between certain partial surfaces on the flank and respective surfaces on particular sleeve portions. The overall convex curved shape does not exclude that at least particular partial surfaces can also be curved concave in themselves relative to the component section to be heated which, however, is not to be shown in the drawing here.

FIG. 2 shows another substantial advantage of the invention relative to the prior art. The induction clamping device according to the invention does not rely on a elevation stop for correct positioning of the sleeve sections to be heated, but it operates with a stop 14 which cannot be changed in elevation direction which is contacted e.g. by the annular face of the sleeve section to be heated respectively. This occurs, because the height of each pole piece 11 increases from its tip or face S in the direction towards its ball joint 7, at least on the side of the flank F which comes into contact with the sleeve section. The term "height" thus designates the extension which the pole piece comprises in the direction (substantially) parallel to the operating rotation axis (3). The height of the pole piece, thus variable, causes that short sleeve sections configured for clamping small tool shaft diameters by themselves only come in contact with the pole pieces in the portion to be heated, while long sleeve sections provided for clamping large shaft diameters come into contact with the pole pieces over the sufficient length by themselves. The complexity for an elevation adjustable stop and the failure modes caused by such stop are thus removed.

The fact that the stop 14 is not elevation adjustable, however, does not mean that it is not moveable as it is evident from FIG. 2, possibly the respective stop 14 is preferably supported, so that it can pivot with the pole piece associated with said stop. Thus, however, it is not rigidly connected with the pole piece, but coupled with the pole piece with clearance, so that no tensions or restrictions occur between the stop 14 rotatable about an axis fixed in space and the pole piece 11 possibly rotating about the ball joint 7 about plural axes.

As evident from FIGS. 1 and 2 in combination, a very effective and uniform type of cooling is provided. Not only the respective component section to be heated is being cooled, but also the pole pieces are being cooled, this means the heat transferred to them while heating the component section is dissipated. For this purpose each of the pole pieces are provided with a group of transversally oriented cooling channels 15. On the back side of the pole pieces 11 facing away from the component section to be heated, a respective plenum 16 is disposed with a sealed connection. Said plenum is fed with coolant through a flexible coolant conduit, preferably configured as a flexible tube or hose. From there the coolant flows through the cooling channels 15 and thus through the pole piece 11. From there it covers the portion of the heated component section proximal to it, moving along the shortest path possible. Since all or several pole pieces load the component section with coolant in this manner, a highly effective and uniform cooling of the component section is provided. Disadvantageous internal stresses occurring in the component section through uneven cooling are thus avoided. As coolants advantageously compressed air or even more effectively, respective cooling liquids are used, in particular also such cooling liquids which are used during machining anyhow and which inhibit corrosion.

In particular, the use of liquid coolants requires an operating cavity which is sufficiently sealed relative the power conducting components and preferably also sufficiently sealed with respect to the bearings. As shown in FIG. 1, an effective and reliable sealing can also be achieved in that the operating cavity 17, thus the center of the housing 6 receiving the component section to be heated and cooled again, is sealed by a closed seal bellows which is inserted into the housing and which is substantially closed in circumferential direction. In the portion of the pole pieces 11 gaiters 19 are integrally formed at the seal bellows, which gaiters seal the coils 20 which ride on the pole pieces and the ball joints 7 effectively relative to the operating cavity.

In order to monitor the surface temperature of the component section to be heated two infrared temperature sensors 26 are provided here, which are directed to the surface of the component section to be heated and which measure its temperature contactless, FIG. 1. Alternatively, or (rarely) additionally a thermocouple can be provided at the respective location of the pole piece side flank F coming in contact with the component section to be heated. Said thermocouple is thin enough or recessed into the surface of the pole side flank so far or disposed at a recessed location, so that is does not protrude in a manner which impedes the close conformal contact of the pole side flank at the component section to be heated.

The temperature measurement is used for preventing impermissible heat up, but when required it can be used as a "control variable" for regular ending of the heating cycle.

A rotatable control sprocket 21 is provided at the housing 6. The pole pieces comprise pivot levers 23 respectively protruding outward into a recess 22 of the control sprocket 21, herein provided in the form of protrusions at the ball joints 7. As soon as the control sprocket is rotated, clockwise in the embodiment, it forces a rotation of the pole pieces into a more open position, away from the intended position of the operating rotation axis 3 of a component to be heated. The control sprocket can thus be pre loaded by a spring element which is not shown here, so that it rotates counter clock wise into the closed position as soon as it is released and so that it forces the pole pieces into a conformal contact with the section to be heated of a component newly inserted into the device.

In order to facilitate an automated operation of the device, the control sprocket is motor driven in the device illustrated herein, re. FIG. 1, the motor has the reference numeral 24. Since the coupling between the control sprocket and the pole pieces is very robust, it is also possible alternatively to bring the pole pieces into conformal contact with the component section to be heated not only through spring loading of the control sprocket but actively. This works particularly well when the motor is controlled through its current draw and thus turned off in time, or when a reversible pneumatic cylinder is used as a drive for the control sprocket instead of the motor. In the present case even a locking of the control sprocket shall be accomplished by the motor (optional). The control sprocket thus forms a self locking worm drive together with the motor, indicated by the worm gear 25 located on the motor shaft.

The current position of the pole pieces is measured as shown in FIG. 1. For this purpose, the pivot lever 23 of one of the pole pieces 11 is coupled with a length sensor. The distance measured by said sensor, or the distance difference is a measure for the current position of the pole piece and of the other pole pieces also coupled with the control sprocket. The electronics of the device draw conclusions with respect to the size of the component section to be heated as a function of the value specified by the length sensor and it selects the operating parameters appropriate thereto.

Eventually it is appreciated that the pole pieces 11 advantageously use the teachings of the published document WO 2006/804678 analogously in as far as, the pole pieces 11 do not contact the sleeve section up to the outermost free end of the sleeve section to be heated, but they maintain a distance or a larger distance from the sleeve section to be heated in the portion of the outermost free end of the sleeve section, so that no disadvantageous inconsistency of the heating occurs even in the portion of the outermost free end of the sleeve section. Regarding the details a reference is made in particular to the embodiments page 4, line 24 through page 5, and line 7 of WO 2006/084678, which apply analogously in the present case.

In closing, it is appreciated with regard to the first embodiment that the pole pieces 11, when they contact the component section to be heated, only release a small scatter field into the ambient due to the cross field principle used, so that a particular shielding of the tool shaft can be omitted when clamping or unclamping tools. Regardless, the device is substantially shielded in outer direction, which is not shown, though it is not shielded in the portion of the tool shaft. This is performed in particular in order to expose in particular operators with pace makers only to permissible field concentrations.

FIGS. 5 and 6 show a second embodiment of the invention, which is configured with differently shaped pole pieces 11. Also these pole pieces 11 can be brought into contact with the circumferential surface of the component section to be heated, but they can also come into conformal contact with the circular annular face of a component section to be heated, thus as illustrated in FIG. 5.

Unless something else applies due to the simplified configuration of the pole pieces the statements made supra regarding the first embodiment also apply to said second embodiment. In particular also here the pole pieces 11 are cyclically controlled in pairs in order to thus increase the air distance between the active pole pieces as described supra for the first embodiment.

Figure 7:
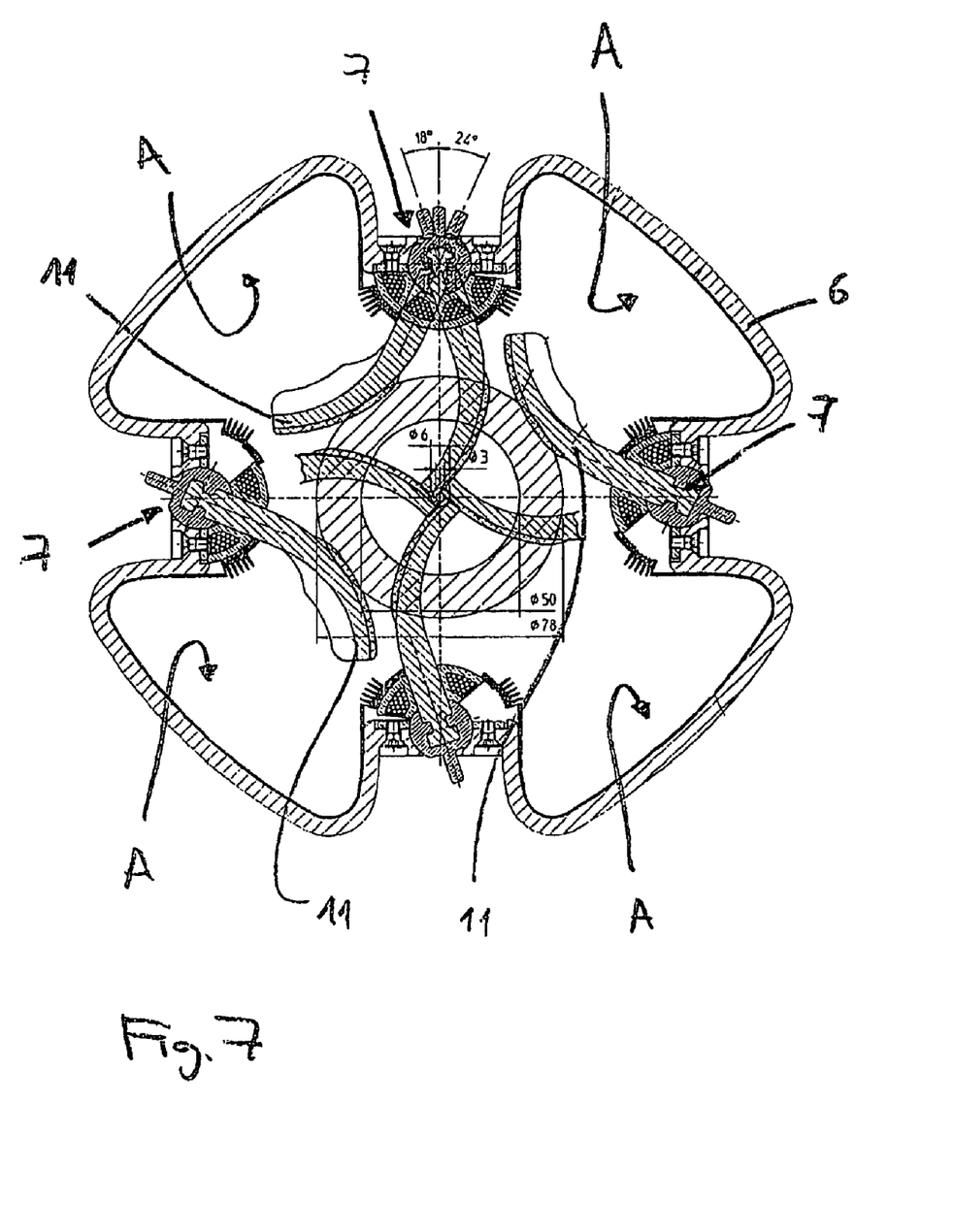
FIGS. 7 and 8 show a third and a fourth embodiment, wherein said embodiments are characterized in that their housing is configured in a certain manner to counteract a short magnetic flux directly between one respective pole piece and the wall section of the housing proximal to said pole piece.

FIG. 7 illustrates a third embodiment of the invention. Said embodiments is characterized in that its housing 6 is configured in a certain manner in order to prevent a short magnetic flux directly between one respective pole piece 11 and the wall section of the housing 6 proximal thereto, further explanations to follow infra. Otherwise said embodiment works the same way as the first two embodiments described supra. Preferably also the pole pieces 11 are controlled as described for the firsts two embodiments. The latter, though, is not mandatory since it can also suffice depending on the particular case to assure that no short magnetic flux or no significant short magnetic flux occurs directly between the pole pieces 11 and the housing 6.

The purpose and the effect of the measures which are used by said third embodiment become evident when comparing the round housing 6 used for the first embodiment according to FIG. 1 and the housing 6 of the third embodiment. When using said round housing of the first embodiment, it can occur under certain conditions, in particular when heating sleeve sections with large diameter, that the usable sections of the pole pieces 11, this means the sections of the pole pieces which are configured for contact with the different sleeve sections, pivot too close to the housing 6. Thus a disadvantageous short magnetic flux can occur directly between the pole piece 11 and the housing 6. Said short magnetic flux does not flow through the sleeve section to be heated, thus it is not useable.

In order to resolve this, the housing 6 is configured in clover shape in this third embodiment in this particular case, as a four leaf clover due to four the pole pieces. This has the effect that the housing comprises its greatest proximity to the center (with reference to the axis of symmetry of the work piece positioned as intended) in the portions where the pole pieces are pivotably disposed, while all other wall portions of the housing are disposed further away from the center. This way, the housing 6 comprises outward bulges A at least in the portion of the functional sections of the pole pieces 11 described supra, so that an increased air distance is disposed between the respective pole piece 11 and the and the outward bulge A. This prevents that a significant short magnetic flux occurs directly between the pole piece 11 or the useable section of the pole piece and the housing 6.

Figure 8:
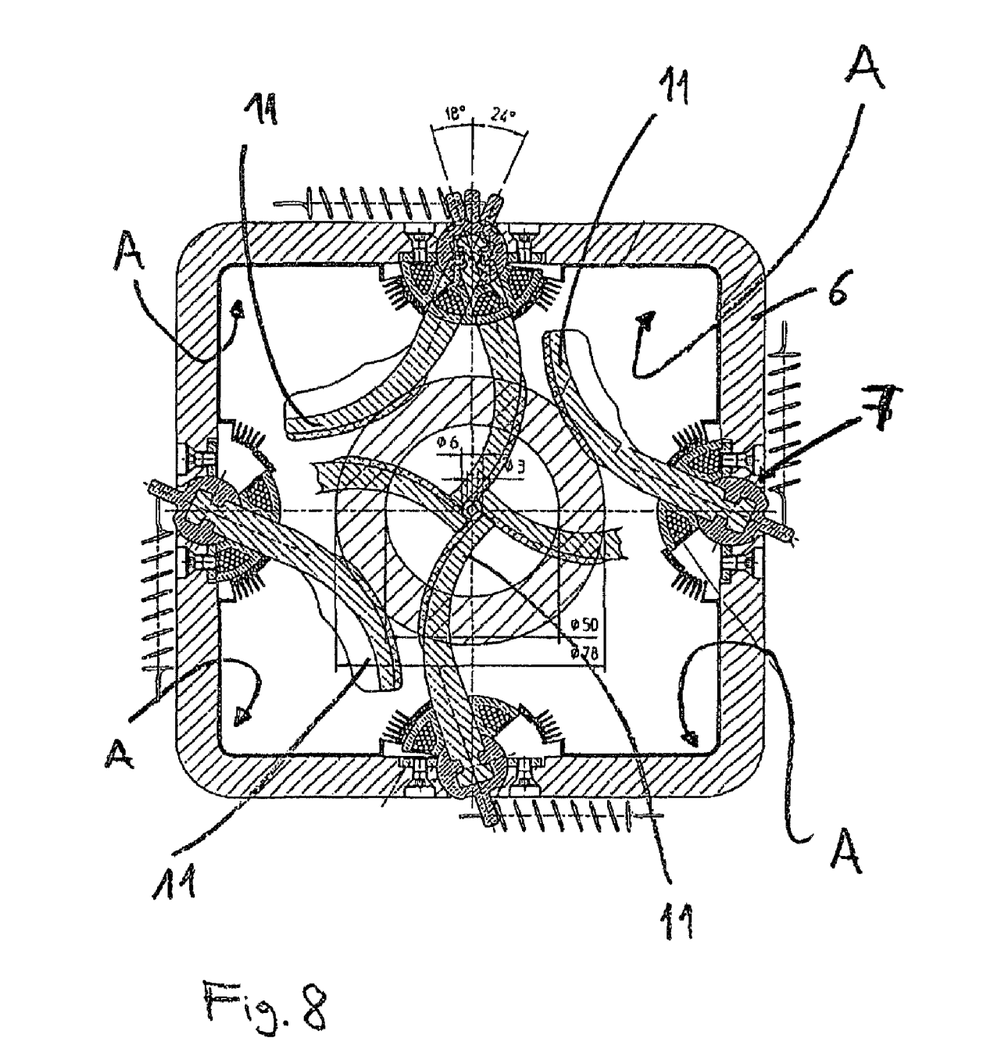

The statements made regarding the third embodiment apply analogously for the fourth embodiment. Also here, the configuration is so that the housing 6 comprises its greatest proximity to the center in the portions where the pole pieces 11 are pivotably supported, while all other wall portions of the housing 6 are disposed further away from the center, so that also here the functional section of each pole piece 11 is disposed in a triangular outward bulge A which in turn creates an increase air distance between the pole pieces 11 compared to the round housing shown in FIG. 1, or its functional section and the housing 6.

The invention claimed is:

1. A device for inductively heating a component section symmetrical relative an axis, made of electrically conductive material, in particular a sleeve section associated with a tool clamping chuck, which sleeve section comprises a receiver opening for supporting a tool through press fit, wherein the device comprises plural pole pieces made of a material conducting magnetic flux and disposed circumferentially about the symmetry axis of the component section inserted into the device as intended, and an induction device for loading the pole pieces with magnetic flux, and thus, so that the magnetic flux of pole pieces adjacent in a circumferential direction is oriented in opposite directions, wherein an axis (feed rotation axis) extending in parallel to the axis of symmetry of the component section is associated with each pole piece, which axis is different from the feed rotation axes of the other pole pieces and about which axis the pole piece is rotatably supported at the device, so that each of the pole pieces are fed towards a surface portion to be heated of a particular work piece through a rotation about the feed rotation axis associated with said pole piece.

2. The device according to claim 1, wherein the device comprises means for reducing undesired short magnetic flux between two adjacent pole pieces and/or a pole piece and the housing and said means are comprised of only one portion of the pole pieces provided at the device being actively loaded with magnetic flux simultaneously and/or the housing being bulged in radially outward direction between support locations of adjacent pole pieces, so that the air distance between the pole piece associated with said outward bulge and the bulged out section of the housing wall is increased.

3. The device according to claim 1, wherein the device is provided with a bulge and the bulge is provided in that the housing comprises a housing section between adjacent pole pieces, which housing section viewed in radial direction, is disposed outside of an imaginary circle which extends through the rotation points of the pole pieces.

4. The device according to claim 1, wherein the device comprises four pole pieces and it is controlled so that only two opposite pole pieces are actively loaded with magnetic flux simultaneously.

5. The device according to claim 1, wherein the device comprise three pole pieces and it is configured, so that always only two adjacent pole pieces are actively loaded with magnetic flux simultaneously.

6. The device according to claim 1, wherein the device only comprises two pole pieces and it is controlled so that the two pole pieces are loaded with magnetic flux simultaneously.

7. The device according to claim 1, wherein each of the pole pieces is supported at the device rotatable about plural axes, so that each of the pole pieces are fed towards the surface portion to be heated of the particular work piece through a rotation about a rotation axis associated with said pole piece, and so that said pole pieces are tilted through a rotation about another rotation axis respectively associated therewith, so that it closely and conformally contacts the surface of the component section to be heated.

8. The device according to claim 1, wherein each of the pole pieces is supported at the device by means of a ball joint.

9. The device according to claim 1, wherein the height of a pole piece increases from its tip towards its feed rotation axis.

10. The device according to claim 1, wherein the portion of the pole pieces, which conformally contacts the component sections to be heated of the different components as intended, has a convex curvature.

11. The device according to claim 1, wherein the surface portion of the pole pieces which conformally contacts the sleeve sections to be heated of the various tool clamping chucks as intended, is comprised of a plurality of discrete contact surfaces which are disposed in series substantially in the direction from the tip of the pole piece towards the feed axis, each of the discrete contact surfaces disposed and configured so that they are brought at least into linear contact with the sleeve section of at least one of the different tool clamping chucks to be heated by the device as intended.

12. The device according to claim 1, wherein the pole pieces are preloaded in feed direction, so that they automatically conformally contact the respective component section to be heated, as soon as they are released from a lifted off position.

13. The device according to claim 7, wherein the pole pieces are preloaded in feed direction, so that they automatically conformally contact the respective component section to be heated, as soon as they are released from a lifted off position, wherein the support and the preload of the pole pieces are respectively configured, so that the pole pieces automatically conformally contact the respective work piece under the effect of the preload and thus so that they additionally pivot relative to the work piece under the effect of the preload after the first contact with the work piece if required, so that the contact portion between the component section to be heated and the pole piece is increased even further.

14. The device according to claim 1, wherein all pole pieces are coupled with an actuator, preferably in the form of a control sprocket rotatably disposed at the device, by means of which they are jointly rotated into a lifted off position.

15. The device according to claim 1, wherein all pole pieces are automatically rotated into a lifted off position electromotorically, pneumatically or by means of plural electrical pull- or push magnets, preferably by actuating the actuator electromotorically, pneumatically or magnetically.

16. The device according to claim 1, wherein the device comprises a sensor which measures the position in which the pole pieces contact the respective work piece to be heated, preferably by measuring the rotation angle of at least one pole piece directly or through measuring the position of the actuator.

17. The device according to claim 1, wherein the device comprises at least one sensor whose current measurement value is a measure for a temperature momentarily reached in the portion of the component section to be heated, wherein the sensor is preferably a temperature sensor measuring contactless and typically oriented towards a portion of the component section to be heated.

18. The device according to claim 1, wherein the device comprises a cooling facility by means of which the re-cooling of the heated component section is accelerated, wherein the cooling facility preferably uses water, compressed air, cooled or liquefied gases as coolants which ideally exits through a plurality of nozzles and which cools the surface of the heated component section substantially uniformly.

19. The device according to claim 18, wherein the used coolant is substantially scavenged, wherein water which is used as coolant is sprayed onto the heated component section finely distributed, so that a substantial portion of the water volume used for cooling evaporates and is subsequently scavenged.

20. The device according to claim 18, wherein the device comprises a facility for capturing and scavenging cooling water running off or dripping off in downward direction.

21. The device according to claim 18, wherein the pole pieces comprise channels flowed through by coolant which are preferably configured, so that the coolant first cools the pole pieces and cools the heated component section from there.

22. The device according to claim 21, wherein the channels flowed through by the coolant extend in the pole pieces transversal to the pole pieces, so that the coolant enters into the pole pieces on the back sides of the pole pieces facing away from the heated component section and exits from the pole pieces on the front side of the pole pieces facing the heated component section, wherein each pole piece is preferably provided with plural cooling channels disposed next to one another, ideally so that substantially the entire portion of each pole piece which is brought into direct contact as intended with the component sections to be heated, is disposed within a zone flowed through by coolant.

23. The device according to claim 21, wherein a respective plenum is applied, preferably sealingly glued onto the back sides of the pole pieces, which back sides face away from the component section to be heated, which plenum is fed with coolant at the appropriate time through a conduit which does not substantially impede the rotation of the pole pieces and which in turn feeds the coolant inlets at the back side of the pole pieces.

24. The device according to claim 1, wherein the coils generating the magnetic field and/or the bearings moveably supporting the pole pieces are sealed against the penetration of coolant, preferably respectively in the form of a moveable seal device, e.g. a bellows, on whose back side which is protected against coolant access the coil and/or the bearing of the pole piece are disposed and which seal device comprises a cutout through which the pole piece extends into the portion of the component section to be heated which is loaded with coolant, so that the cutout sealingly envelopes said pole piece.

25. The device according to claim 24, wherein the seal device is configured as an integral seal bellows substantially closed in circumferential direction into which a gaiter is fabricated for each pole piece.

26. An automated tool clamping device with an electronic control and moveable pole pieces according to claim 1, wherein the device comprises a sensor which measures the position in which the pole pieces conformally contact the sleeve section of the respective tool clamping chuck and which adjusts the particular heating time period and/or the heating power and preferably the particular cooling flow and/or the timing of the coolant application of the tool clamping device as a function of the measured position.

27. An automated tool clamping device according to claim 26, wherein the tool clamping device comprises at least one sensor whose current measurement value is a measure for a temperature momentarily reached in the portion of the component section to be heated and whose measurement value influences the heating time period and/or the heating power.

* * * * *